No. 617,082. Patented Jan. 3, 1899.
J. H. CULVER.
CALIPERS.
(Application filed Sept. 28, 1897.)
(No Model.)
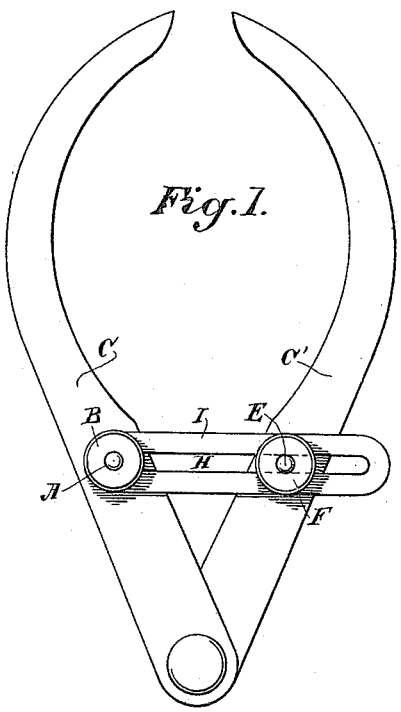
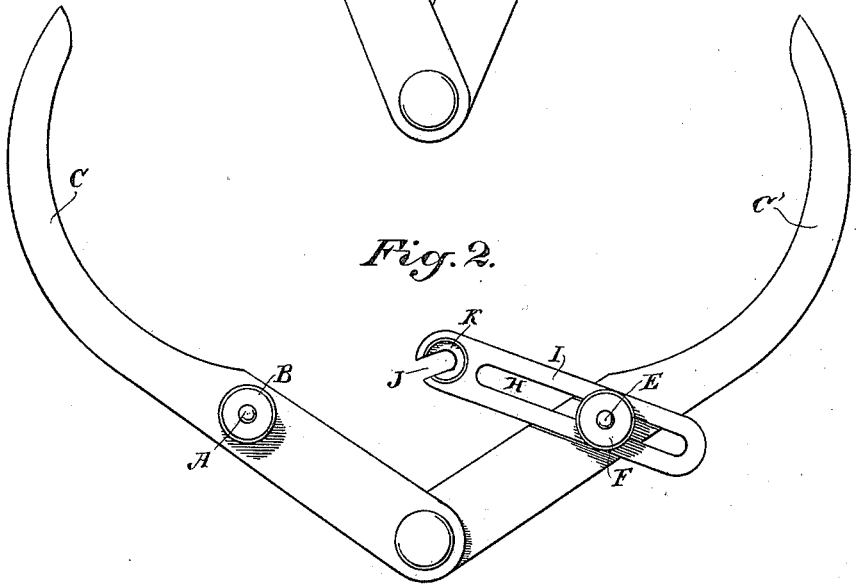
Witnesses,
Inventor
James H. Culver
By Dewey & Co.
Attys.

UNITED STATES PATENT OFFICE.

JAMES H. CULVER, OF SAN FRANCISCO, CALIFORNIA.

CALIPERS.

SPECIFICATION forming part of Letters Patent No. 617,082, dated January 3, 1899.

Application filed September 28, 1897. Serial No. 653,303. (No model.)

*To all whom it may concern:*

Be it known that I, JAMES H. CULVER, a citizen of the United States, residing in the city and county of San Francisco, State of California, have invented an Improvement in Calipers; and I hereby declare the following to be a full, clear, and exact description of the same.

My invention relates to an improvement in calipers which have a straight or curved slotted bar or metal piece to hold the legs in a fixed position; and it consists, essentially, in a novel construction of a detachable holding-bar, which is fully shown in the accompanying drawings, the letters referring to the same parts in each figure.

Figure 1 is a view with the bar engaged. Fig. 2 shows it detached. Fig. 3 is a longitudinal section of the holding bar or piece and connections.

One end of the holding-bar I of calipers is usually fixed and held in position by a rivet. In my invention it is held in position by a nut B and a screw A to attach it to one leg of the calipers at a suitable distance from the central pivot of the legs. A hole is made through one end of the holding-bar the size of the screw A in the caliper-leg C, and then with this hole as a center the same is countersunk, as at K, to a depth of about one thirty-second of an inch, with a slightly-tapered bore and of size to correspond with the end of the nut B, turning on or with the screw A. The end of this nut is flat, with slightly-beveled edge to fit the countersunk recess in the holding-bar. The end of the holding-bar when in position, with the radius of distance from center pivot of the legs of the calipers to the screw A on which the nut B turns, is cut entirely through from the end to the central hole, as shown at J, in size a little greater in width than the diameter of the screw. The holding-bar is slotted in the usual manner to within about one-eighth of an inch of the countersunk recess, as shown at H, Fig. 3. Another screw E, of suitable size, with a nut F running thereon, is attached to the other leg of the calipers to be screwed down upon the holding-bar, as in ordinary calipers. On this fixed screw, under the holding-bar and resting on the leg of the calipers, is a washer L of the diameter of the width of the holding-bar and thickness of the other leg.

It is manifest that when the bar is in place and held by the nut B and the calipers in the position shown in Fig. 1 it is in fact an ordinary calipers which can be opened or closed and fastened in any position by the screw E and the nut F when it is screwed down upon the bar. The nut B when screwed down into the countersunk cavity holds that end firmly, the same as if riveted, yet allowing the slight movement necessary for adjustment.

If desired to obtain the size of an object which will not permit the removal of calipers without changing the leg, and thereby losing the dimension, the nut F on screw E is loosened and the caliper-legs brought together on the object, when the nut F is screwed firmly down on the holding-bar, and the nut B is turned up until it is out of the countersunk cavity, when the calipers can be opened, as shown in Fig. 2, the screw A and the nut B moving away from the bar through the radial cut in the end. On bringing it back until the screw A is in contact with the central hole the nut B can be screwed down into the countersunk recess, and the calipers will be locked in the exact position it was before being removed and the desired measurement may be obtained.

It will be understood that the screws may be fixed and the nuts turn upon them, or the screws may be turnable in threaded holes in the caliper-legs to lock or unlock the bar.

Having thus described my invention, what I claim as new, and desire to secure by Letters Patent, is—

1. Calipers having curved legs pivoted together at one end, the other ends adapted to open and close about said pivot, clamping-screws engaging each of the legs at approximately equal distances from the pivot-point, a bar having a longitudinal slot through which one of said screws passes and by which it is adjustably clamped to its leg, and an opening made in the end of the bar adapted to receive the screw of the opposite leg whereby the two may be set, disengaged and opened, returned and reset at the same point of adjustment.

2. In calipers of the character described, a device for clamping the legs of the calipers to fit the article to be measured, and means for changing the measure and afterward restoring it without applying to the measured article, consisting of clamping-screws adapted to engage the legs of the calipers at an approximately equal distance from the pivot about which the legs are turnable, a bar having an opening in one end into which one of said screws fits, a slot in the other end fitting the screw upon the other leg and allowing the legs to be adjusted with relation to each other to fit the article being measured, the bar being fixed upon the leg after said measurement is taken, and a slot connecting with the first-named hole, and concentric with the pivot-pin of the calipers whereby when the screw is loosened, its shank may be withdrawn from the slot without disturbing the position of the bar and its lock upon the other leg.

In witness whereof I have hereunto set my hand.

JAMES H. CULVER.

Witnesses:
   LEE D. CRAIG,
   GEO. H. STRONG.